United States Patent [19]
Benson

[11] Patent Number: 5,816,653
[45] Date of Patent: Oct. 6, 1998

[54] APPARATUS AND METHOD FOR ADJUSTING THE POSITION OF A SUPPORTING ELEMENT IN A SEAT

[75] Inventor: Joseph Benson, South Lyon, Mich.

[73] Assignee: Schukra of North America Ltd., Windsor, Canada

[21] Appl. No.: 819,151

[22] Filed: Mar. 17, 1997

[51] Int. Cl.[6] ....................................................... A47C 7/46
[52] U.S. Cl. .................................. 297/284.4; 297/284.1
[58] Field of Search ............................. 297/284.4, 284.1, 297/284.3

[56] References Cited

U.S. PATENT DOCUMENTS

| | | |
|---|---|---|
| 4,182,533 | 1/1980 | Arndt et al. . |
| 4,981,131 | 1/1991 | Hazard . |
| 5,050,930 | 9/1991 | Schuster et al. ...................... 297/284.4 |
| 5,065,079 | 11/1991 | Ogasawara ........................... 297/284.1 |
| 5,197,780 | 3/1993 | Coughlin ........................... 297/284.4 X |
| 5,217,278 | 6/1993 | Harrison et al. ................. 297/284.4 X |
| 5,243,267 | 9/1993 | Ogasawara . |
| 5,397,164 | 3/1995 | Schuster et al. ................ 297/284.4 X |
| 5,523,664 | 6/1996 | Ogasawara ....................... 297/284.4 X |
| 5,641,205 | 6/1997 | Schmidt ............................ 297/284.4 X |
| 5,651,583 | 7/1997 | Klingler et al. ...................... 297/284.4 |

FOREIGN PATENT DOCUMENTS

| | | |
|---|---|---|
| 680 249 | 11/1994 | Australia . |
| 0011396 | 5/1980 | European Pat. Off. . |
| 0131334 | 7/1984 | European Pat. Off. . |
| 2346125 | 3/1975 | Germany . |
| 3713370 | 11/1987 | Germany . |
| 4116836 | 11/1992 | Germany . |
| 4314325 | 11/1994 | Germany . |
| 94007393 | 4/1994 | WIPO ................................. 297/284.4 |

OTHER PUBLICATIONS

English language abstract of DE 3,713,370.
English language abstract of DE 2,346,125.
English language abstract of DE 4,116,836.
Published English language version of DE 4,116,836.
English language abstract of JP 2,081,740.
English language abstract of JP 1,232,961.
English language translation of WO 94/25307.
R.G. Hazard, M.D., Backcycler™ Technology, Advertisement, not dated.

Primary Examiner—Peter M. Cuomo
Assistant Examiner—Rodney B. White
Attorney, Agent, or Firm—Howard & Howard

[57] ABSTRACT

The apparatus stimulates the muscles of the a seat occupant. The apparatus includes a flexible supporting element adapted to be coupled to a seat for movement relative thereto and driving means for automatically and repeatedly moving the flexible supporting element through an adjustment cycle. The adjustment cycle includes a plurality of first incremental movements in a first direction followed by a plurality of second incremental movements in a second direction. Each of the first and second incremental movements are separated by a first time interval. The method relieves muscle fatigue in a seat occupant by incrementally adjusting the curvature of the supporting element and generally includes the steps of placing a supporting element in a first position operatively engaging a muscle of the seat occupant wherein the first position defines a first degree of curvature of the supporting element. The method further includes automatically adjusting the curvature of the supporting element according to an adjustment cycle that includes maintaining the first degree of curvature for a first time period, increasing the degree of curvature a first amount after the first time period to define a second degree of curvature, maintaining the second degree of curvature for a second time period, and decreasing the degree of curvature of the supporting element a second amount after the second time period to define a third degree of curvature wherein the first time period is equal to the second time period.

22 Claims, 3 Drawing Sheets

APPARATUS AND METHOD FOR ADJUSTING THE POSITION OF A SUPPORTING ELEMENT IN A SEAT

BACKGROUND OF THE INVENTION

The present invention relates to an apparatus and method for reducing the symptoms and occurrences of muscle fatigue in a seat occupant and, more particularly, to an apparatus and method for adjusting the position of a supporting element in a seat.

Persons who have to remain seated for relatively long periods of time develop symptoms of fatigue and disturbed circulation, which as a whole have a negative effect on their well-being, concentration, and performance. In the case of relatively long automobile trips in particular, this is undesirable in terms of road safety. In fact it is recommended that people take rest breaks and engage in physical exercises every now and then, but this cannot always be done, for example in stop light-controlled traffic, and finally it is not advisable to stop in the dark at freeway parking areas.

A primary contributor to muscle fatigue in sedentary individuals is the build-up of lactic acid within the muscle fibers and surrounding tissues. Additionally, an individual's posture gradually slumps during prolonged periods of sitting thereby changing the curvature of the person's spine. While the prior art has recognized that some relief from back pain is provided by manipulating the curvature of a seat occupant's spine, the art has yet to identify and capitalize on the benefits of preventing and dissipating lactic acid build-up. In this regard, the present invention provides for repeated movement of the spinal area and muscle tissues in small increments to create a pumping action that increases blood circulation through the muscle fibers and prevents lactic acid build-up. The periodic displacement of the spine and muscle tissues need not be of such a magnitude as to be readily perceptible by the seat occupant. In fact, small movements of a lumbar supporting element that are barely perceptible to a seat occupant and that occur at regular intervals have been found to be particularly effective at preventing the build-up of lactic acid within muscle tissues thereby virtually eliminating muscle fatigue during prolonged periods of sitting.

As indicated above, there are many seats familiar to the art that attempt to address the occurrence of, and symptoms related to, muscle fatigue and disturbed circulation. More particularly, with respect to motor-vehicle seats, massaging elements, hand-driven or motor-driven arching elements adjustable in height and degree of curvature, and automatically or manually adjustable fluid inflatable bellows have been suggested to reduce muscle fatigue during prolonged periods of sitting. However, each of these purported solutions fail to adequately alleviate muscle fatigue, give rise to undesirable effects on the seat occupant, or have other characteristics that have prevented their widespread acceptance.

More particularly, the vibrating or massaging mechanisms known in the art, while being effective to a certain degree, are directed at relieving the muscle fatigue perceived by the seat occupant rather than the build up of lactic acid in the muscle that contributes to the fatiguing of the muscle itself. Additionally, vibrating mechanisms often transmit vibrations to other parts of the motor vehicle and give rise to unwelcome secondary effects.

The adjustable arching supporting elements known in the art are generally mechanical or motor driven apparatuses positionable according to the preference of the seat occupant. Such manually actuated systems fail to provide the repetitive and specifically controlled positioning features of the present invention that have been found to be particularly effective at reducing or eliminating lactic acid build-up and muscle fatigue. Finally, bellows or inflatable bag type elements have not proven to have sufficient fatigue strength to withstand the repeated adjustments necessary over the warranty period insisted upon by seat manufacturers.

Accordingly, it is an object of the present invention to provide an apparatus and method for adjusting the position of a supporting element within a seat according to a specific cycle to relieve muscle fatigue of the seat occupant.

A further object of the present invention is to provide a supporting element and drive assembly having a controller adapted to selectively position the supporting element according to a predetermined sequence.

It is another object of the present invention to provide a drive assembly having a controller that periodically and repeatedly displaces the supporting element an incremental distance that is barely perceivable by the seat occupant.

It is yet a further object of the present invention to provide a method for adjusting the position of a supporting element in a seat in the manner described above.

SUMMARY OF THE INVENTION

In view of the above, the present invention provides a supporting element within a vehicle seat that includes a controller for automatically adjusting the position of the supporting element according to a predetermined cycle. More particularly, the apparatus of the present invention is adapted for stimulating the muscles of the seat occupant and includes a flexible supporting element adapted to be coupled to a seat for movement relative thereto. Driving means are provided to automatically and repeatedly move the flexible supporting element through an adjustment cycle that includes a plurality of first incremental movements in a first direction followed by a plurality of second incremental movements in a second direction. Each of the first and second incremental movements are separated by a first time interval. The method of the present invention relieves muscle fatigue in a seat occupant by incrementally adjusting the curvature of the supporting element and generally includes the step of placing a supporting element in a first position operatively engaging a muscle of the seat occupant wherein the first position defines a first degree of curvature of the supporting element. The method includes the additional steps of automatically adjusting the curvature of the supporting element according to an adjustment cycle that includes maintaining the first degree of curvature for a first time period, increasing the degree of curvature a first amount after the first time period to define a second degree of curvature, maintaining the second degree of curvature for a second time period, and decreasing the degree of curvature of the supporting element a second amount after the second time period to define a third degree of curvature wherein the first time period is equal to the second time period.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENT

The present invention relates to an apparatus and method for adjusting the position of a supporting element in a seat according to a predetermined sequence. In general, the adjustment of the supporting element is controlled by a module that conveys a string of electric pulses to an electric motor in a predetermined pattern to automatically and cyclically adjust the position of the supporting element in small intervals that are barely perceivable by the seat occupant. The particular adjustment sequence disclosed and claimed herein has been found to be particularly effective at reducing muscle fatigue in a seat occupant's back. More particularly, the periodic adjustment provided by the present invention operates to restore muscle strength by discharging lactic acid that tends to build up in sedentary muscles. As a result, the present invention virtually eliminates the muscle fatigue that generally occurs during extended stationary periods in a seat.

The following description of the present invention is merely exemplary in nature and is not intended to limit the scope of the claimed invention. Moreover, while the invention is depicted for use in the lumbar region of a seat, the description is intended to adequately teach one skilled in the art to make and use the apparatus and method described and claimed herein in a variety of environments.

Figure 1:
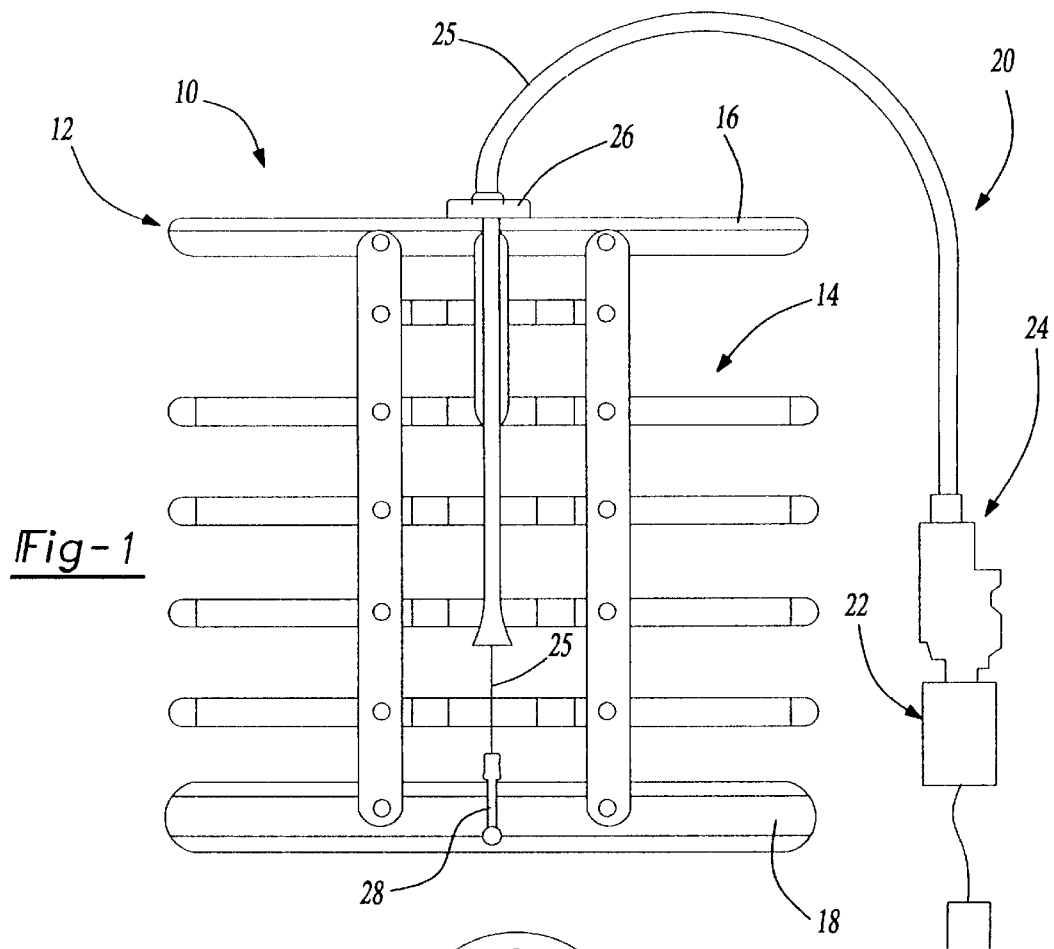
FIG. 1 is a front view of a supporting element and positioning assembly according to the present invention.
Figure 2:
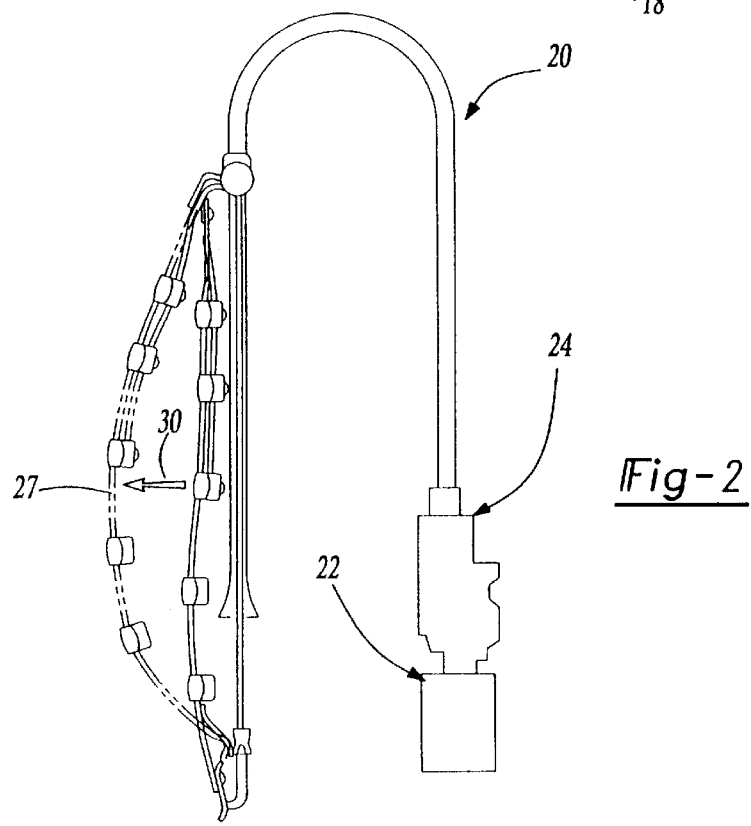
FIG. 2 is a side view of the supporting element shown in FIG. 1.

As illustrated in FIG. 1 of the drawings, a lumbar support 10 is shown to include a flexible elastic supporting element 12 having a body 14 interconnecting an upper portion 16 and a lower portion 18. A positioning assembly 20 is coupled to supporting element 12 to selectively displace upper portion 16 relative to lower portion 18 thereby bowing body 14 such as is illustrated in FIG. 2. In the preferred embodiment, positioning assembly 20 includes an electric motor 22 coupled to drive an actuating assembly 24 that includes a cable 25 coupled to upper and lower portions 16 and 18 of supporting element 12 such as by attachment fitting 26 and 28, respectively. While the embodiment of the present invention described herein is specifically adapted for use with the two-way or four-way electric lumbar supports manufactured by Schukra@ of North America Ltd. having a place of business in Etobicoke, Ontario, those skilled in the art will appreciate that a variety of supporting elements and actuating apparatuses may be used with the present invention without departing from the proper scope of the appended claims. For example, the supporting element may include an inflatable membrane coupled to a pressure regulator.

Supporting element 12 is illustrated in FIG. 2 to be positionable in a variety of degrees of curvature of body 14 each defining an apex 27. As described below, apex 27 is displaceable in a first direction indicated by arrow 30 toward the seat occupant and in a second direction away from the seat occupant such as opposite arrow 30 by selectively increasing and decreasing, respectively, the curvature of body 14.

Figure 3:
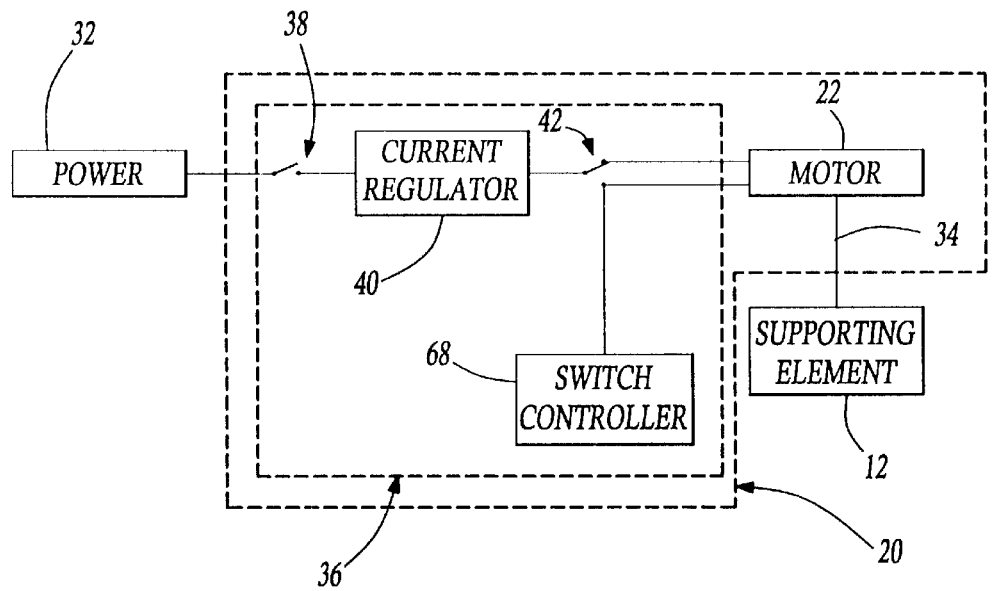
FIG. 3 is a schematic illustration of a positioning assembly control module according to the present invention.
Figure 5:
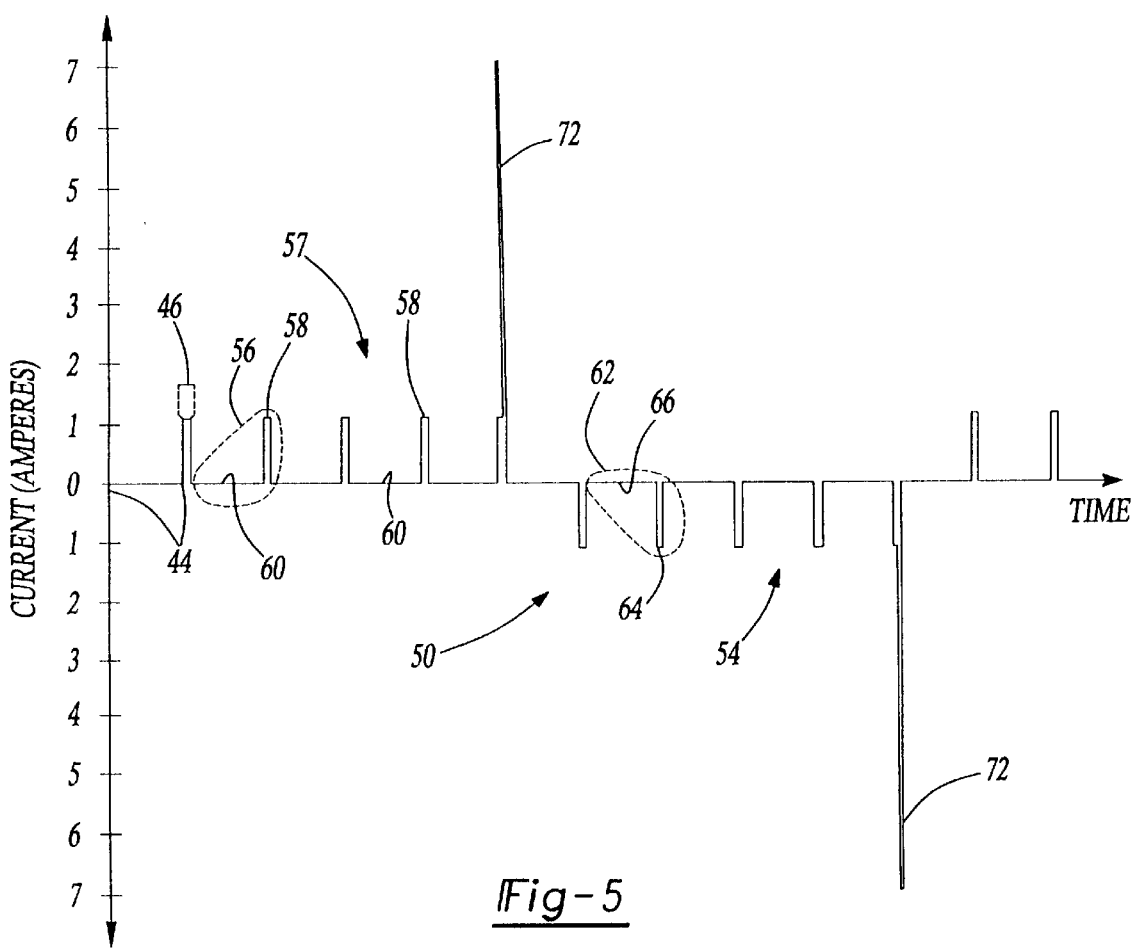
FIG. 5 illustrates the preferred pulse string provided by the present invention.

FIG. 3 schematically illustrates an embodiment of the present invention wherein positioning assembly 20 is adapted to change the curvature of supporting element 12 according to a predetermined adjustment cycle. In this embodiment, positioning assembly 20 interconnects supporting element 12 and a power source 32. As shown, positioning assembly 20 includes a coupling 34, such as the previously described actuating assembly 24, mechanically connecting motor 22 to supporting element 12 and a control module 36 electrically connecting motor 22 to power source 32. As is explained in greater detail hereinafter, module 36 is adapted to communicate a string of electric pulses to motor 22 in order to selectively drive motor 22 and displace supporting element 12 according to the predetermined adjustment cycle. A graphic illustration of a preferred pulse string 50 is illustrated in FIG. 5 and described in detail below. The following description of the components and operation of module 36 provides a general illustration of the function and operation of the module. However, those skilled in the art will appreciate that a variety of equivalent components known in the art may be substituted for those described below and/or the interrelationship between the components may be modified such that module 36 communicates the same or an equivalent string of electric pulses to motor 22.

With continued reference to FIG. 3, an embodiment of module 36 is shown to include an activator 38, current regulator 40, and polarity switch 42 disposed between power source 32 and motor 22. Activator 38 is illustrated as a switch positionable between an open position preventing the flow of an electric current from power source 32 to current regulator 40 and a closed position wherein an electric current is communicated to current regulator 40. In the preferred embodiment, activator 38 communicates with an input 39 (FIG. 4) that is manipulable by a seat occupant to selectively initiate and terminate the communication of the pulse string 50 (FIG. 5) to motor 22 and thereby the performance of the predetermined adjustment cycle.

In the preferred embodiment, input 39 includes a lumbar switch (not shown) coupled to the exterior surface of the seat. The lumbar switch may be manipulated by the seat occupant to adjust the position of the lumbar support by changing the curvature of supporting element 12. In a manner known in the art, input 39 and activator 38 are configured such that rapid actuation of the lumbar switch initiates the adjustment cycle provided by current regulator 40 by closing activator 38 as described above. Those skilled in the art will appreciate that a variety of equivalent activating structures such as, for example, a momentary switch may be used without departing from the scope of the present invention as defined by the appended claims.

Current regulator 40 functions to selectively communicate pulses of an electric current to polarity switch 42 such as by a timing circuit. While activator 38 is in its closed position, current regulator 40 prevents the flow of an electric current to polarity switch 42 during a first time interval 44 and communicates a current pulse to switch 42 during a second time interval 46 thereby defining a repeating pulse segment 56 (FIG. 5). The repeating pulse segments provide an intermittent current communicated to motor 22 through polarity switch 42 so as to define pulse string 50 as hereinafter described.

A complete cycle of pulse string 50 is illustrated in FIG. 5 with reference to a horizontal time axis beginning at the initiation of the control sequence through input 39 of activator 38. Pulse string 50 is illustrated to include a first pulse section 52 followed by second pulse section 54 that are continuously repeated during the predetermined adjustment cycle. First pulse section 52 includes a plurality of repeating first pulse segments 56 each made up of a first pulse 58 separated by a first rest period 60 characterized by the absence of current. Similarly, second pulse section 54 includes a plurality of repeating second pulse segments 62 each made up of a second pulse 64 and a second rest period 66. The transition between first and second pulse sections 52 and 54, respectively, is controlled by polarity switch 42 and switch controller 68.

Polarity switch 42 is of a type generally known in the art and is adapted to selectively reverse the polarity of the electric connection between module 36 and motor 22 so as to cycle the movement of motor 22 in first and second directions. As schematically illustrated in another embodiment of module 36 shown in FIG. 4, polarity switch 42 communicates with a switch controller 68. Switch controller 68 selectively moves polarity switch 42 from and to a first position defining a first polarity connection between module 36 and motor 22 to and from a second position defining a second polarity connection. As generally described above, the pulses generated by current regulator 40 are communicated to motor 22 through the first polarity connection to define the repeating first pulse segments 56 and first pulse section 52. Similarly, the second polarity connection communicates the pulses generated by regulator 40 to motor 22 as repeating second pulse segments 62 thereby defining second pulse section 54. Motor 22 is coupled to module 36 such that first pulse section 52 drives motor 22 in a first direction and, through mechanical coupling 34, moves supporting element 12 in the direction indicated by arrow 30. Likewise, second pulse section 54 causes motor 22 to move apex 27 of supporting element 12 opposite arrow 30. It should be appreciated that a variety of electro-mechanical or software implemented polarity switches known in the art may be used with the present invention without departing from the proper scope of the appended claims.

As previously described, current regulator 40 is configured to communicate an electric current to polarity switch 42 during second time interval 46 and to prevent the flow of current during first time interval 44. In the preferred embodiment, the duration of first time interval 44 is within a range of about 1.0 to 1.5 seconds while the duration of second time interval 46 ranges from about 5 seconds to about 25 seconds. The preferred time periods are a first time interval 44 of one and one-tenth (1.1) seconds and a second time interval 46 of fifteen (15) seconds. By this arrangement, the one and one-tenth second electric pulses are communicated to motor 22 every fifteen seconds to alter the curvature of the supporting element.

Those skilled in the art will appreciate that the specific incremental curvature adjustment provided by the one and one-tenth second pulse is dependent upon several variables including the specific configuration of motor 22, the firmness of the supporting element, the amount of padding between the supporting element and the seat occupant, and the load that the seat occupant exerts on the supporting element. With these variables in mind, the preferred curvature adjustment magnitude for the supporting element is one that is barely perceivable to the seat occupant, i.e., on the edge of perception, yet sufficient to stimulate the seat occupant's muscles proximate to the supporting element or slightly modify the posture of the seat occupant. It is specifically preferred that the magnitude of each incremental movement of apex 27, while dependent in application on the variables discussed above, is within the range of about six (6) millimeters to about ten (10) millimeters. This periodic yet minimal movement of the occupant's muscles and spine is generally sufficient to create a pumping action that increases circulation and dissipates the build-up of lactic acid that generally occurs during periods of sitting.

It should be appreciated that it is desirable to specifically control not only the magnitude and frequency of each supporting element curvature adjustment but also the full range of travel of supporting element 12 that is provided by module 36. More particularly, while again being dependent upon variables such as the firmness of the supporting element and the amount of padding between the supporting element and the seat occupant, the preferred full range of apex travel is within the range of about thirty-six (36) millimeters to about forty (40) millimeters. In accordance with the magnitude of the incremental adjustment set forth above, the full range of travel is generally divided into about four (4) to about six (6) separate actuations so as to limit the seat occupant's perception of the adjustment and to define the durations of first and second pulse sections 52 and 54, respectively.

In this regard, switch controller 68 (FIG. 3) is adapted to change the position of switch 42 at predetermined displacement magnitudes or time periods thereby reversing the polarity of the connection between module 36 and motor 22. For example, it is preferred that module 36 includes end stops (not shown) defining the maximum and minimum curvature displacement provided by the adjustment cycle. Among the many options familiar to the art, end stops may include mechanical stops preventing movement of the motor or actuator beyond the maximum or minimum values, software implemented stops of a similar nature, a counter for limiting the displacement to a fixed number of pulse segments of a particular polarity, or a counter for limiting the time period for generating pulses of a particular polarity. Of course, other equivalent timing or measurement apparatuses may be used without departing from the scope of the invention as defined by the appended claims.

In the preferred end stop configuration, switch controller 68 includes a stall sensor 70 configured to detect the stalling of motor 22 upon reaching one of the respective mechanical or software implemented end stops. In the preferred embodiment, stall sensor 70 is a current meter communicating with polarity switch 42 and adapted to actuate switch 42 when the measured current exceeds a predetermined value. It is contemplated that the specifications of motor 22 provide for a running current between 0.7 and 3.0 amperes with an optimal running current of 1.25 amps. In this configuration the stall current of motor 22 is 6.5 to 7.0 amperes as indicated by the current spikes 72 in FIG. 5. The full travel of the motor 22, actuator 24, or supporting element 12 as limited by the end stops is preferably divided into four to six actuations defined by the communication of pulses 58 and 64 to motor 22. However, as discussed above, the magnitude of adjustment provided by each pulse 58 and 64 as well as the total number of pulse segments 56 and 62 within a repeating pulse section 52 and 54 may be modified so as to provide the desired magnitude of supporting element curvature adjustment.

Those skilled in the art will appreciate that activator 38 is adapted to remain in the closed position allowing current regulator 40 and polarity switch 42 to continually generate and communicate pulse string 50 to motor 22 until the operator cancels the adjustment cycle. It is contemplated that cancellation may occur through manual or automatic intervention. For example, in the preferred embodiment, manual actuation of the lumbar switch via input 39 operates to open activator 38 thereby terminating the adjustment cycle. Similarly, the adjustment cycle may be cancelled after a fixed time period, when the vehicle ignition is turned off, or any other manner known in the art. It should be appreciated that the adjustment cycle may be re-initiated at any time by the seat occupant such as through input 39 in the manner previously described.

Figure 4:
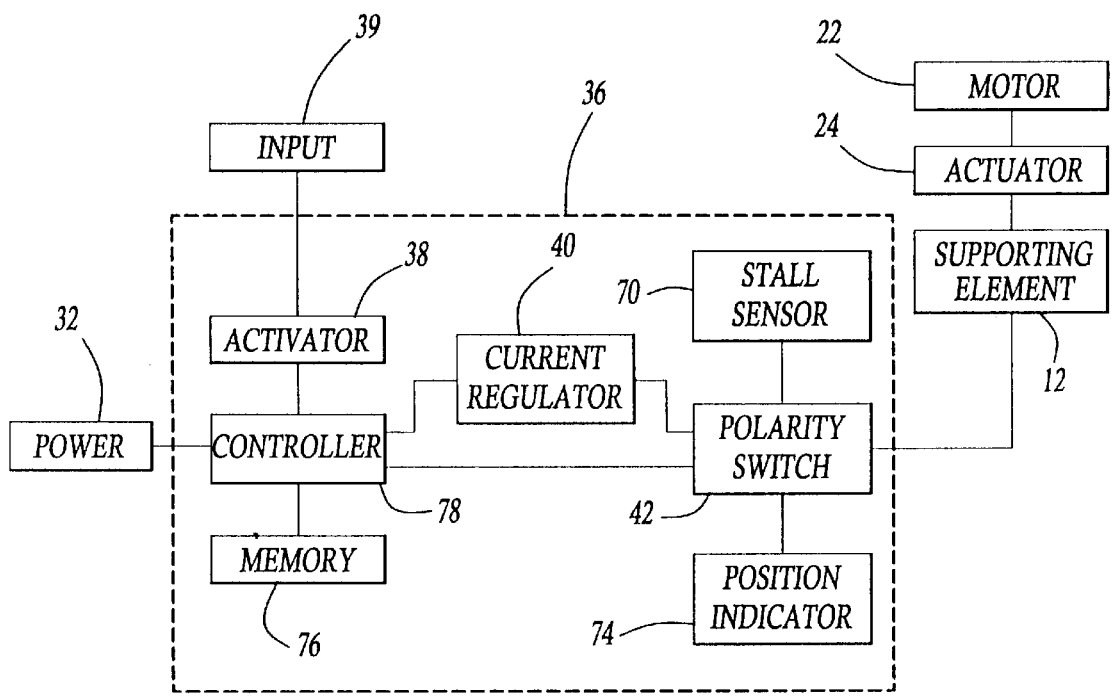
FIG. 4 is a schematic illustration of the position assembly control module according to another embodiment of the present invention.

In addition to the automated supporting element adjustment feature, the embodiment of module 36 shown in FIG. 4 includes a position indicator 74 communicating with motor 22 and a memory 76. In a manner generally known in the art, position indicator 74 is adapted to record the position of motor 22, actuator 24, or support element 12 in memory 76 upon initiation of the adjustment cycle through activator 38 and input 39. In this embodiment, module 36 includes a controller 78 adapted to retrieve the initial position from memory 76 and return motor 22, actuator 24, or supporting element 12 to the initial position upon cancellation of the adjustment cycle. Accordingly, controller 78 is shown to communicate with power source 32, polarity switch 42, and memory 76 such that controller 78 may selectively position polarity switch 42 and communicate an electric pulse of an appropriate duration to return the motor 22 or other element to the initial position. Those skilled in the art will appreciate that a variety of position indicating structures known in the art may be used with the present invention, such as, for example, a transducer, without departing from the scope of the appended claims.

As described above, the present invention provides an apparatus and method for adjusting the position of a supporting element within a seat according to a predetermined cycle in order to relieve muscle fatigue of the seat occupant. The repeated movement of the supporting element in small increments that are virtually imperceptible by the seat occupant creates a pumping action that increases blood circulation through the muscle fibers and prevents lactic acid build-up within the muscles. The dissipation of lactic acid reduces or eliminates muscle fatigue that generally occurs during long periods of sitting. While the preferred timing of the supporting element adjustments described and claimed herein have been found to be particularly suitable for relieving muscle fatigue in the present apparatus and method, those skilled in the art will appreciate that other time intervals and adjustment magnitudes may be used without departing from the proper scope of the present invention as defined by the appended claims.

Various other advantages of the present invention will become apparent to those skilled in the art after having the benefit of studying the foregoing text and drawings, taken in conjunction with the following claims.

What is claimed is:

1. An apparatus for stimulating the muscles of a seat occupant, comprising:
   a flexible supporting element adapted to be coupled to a seat for movement relative thereto; and
   driving means for automatically and repeatedly moving said flexible supporting element through an adjustment cycle that includes a plurality of first consecutive incremental movements in a first direction followed by a plurality of second consecutive incremental movements in a second direction, each of said first and second consecutive incremental movements separated by a first time interval.

2. The apparatus of claim 1 wherein said first time interval is within the range of about five seconds to about twenty five seconds.

3. The apparatus of claim 1 wherein said first time interval is about fifteen seconds.

4. The apparatus of claim 1 wherein said first time interval is fifteen seconds.

5. The apparatus of claim 1 wherein said driving means includes an electric motor and a controller, said electric motor coupled to said supporting element, said controller coupled to said electric motor and electrically connectable to a power source, said electric motor adapted to move said supporting element in said first direction when provided with an electric current of a first polarity and to move said supporting element in said second direction when provided with an electric current of a second polarity.

6. The apparatus of claim 5 wherein said controller is adapted to automatically communicate a string of electric pulses to said electric motor whereby said electric motor moves said supporting element through said adjustment cycle, said string of electric pulses including a first pulse section and a second pulse section, said first pulse section including a plurality of first pulse segments having a rest period followed by a pulse of electric current, said second pulse section including a plurality of second pulse segments having a rest period followed by a pulse of electric current, said controller further including polarity switching means for providing a first polarity connection between said controller and said motor when said controller communicates said first pulse section to said motor and for providing a second polarity connection between said controller and said motor when said controller communicates said second pulse section to said motor.

7. The apparatus of claim 6 wherein each of said pulses of electric current occur during an interval of not less than about one second and not more than about one and one-half seconds.

8. The apparatus of claim 7 wherein each of said pulses of electric current occur during an interval of about one and one-tenth seconds.

9. The apparatus of claim 1 wherein said driving means is adapted to bow said flexible supporting element thereby forming a curvature having an apex, each of said first incremental movements increasing said curvature and moving said apex in said first direction, each of said second incremental movements decreasing said curvature and moving said apex in said second direction.

10. The apparatus of claim 9 wherein each of said first and second incremental movements of said apex does not exceed about ten (10) millimeters.

11. The apparatus of claim 10 wherein each of said first and second incremental movements of said apex is within a range of about six (6) millimeters to about ten (10) millimeters.

12. The apparatus of claim 9 wherein said adjustment cycle includes four (4) to six (6) first incremental movements and four (4) to six (6) second incremental movements.

13. An apparatus for automatically moving a supporting element in a seat in a first direction and a second direction according to an adjustment cycle, said apparatus comprising:
   a driving assembly having an output movable in a first direction and a second direction, said output adapted to be connected to a supporting element in a seat; and
   a controller connectable to a power source and adapted to automatically communicate a pulse string of electric current to said driving apparatus to move said output in a plurality of consecutive incremental movements in said first direction and a plurality of consecutive incremental movements in said second direction according to an adjustment cycle, said controller including
   current regulating means communicable with a power source for generating said pulse string, and
   switching means for automatically establishing a first polarity connection and a second polarity connection between said current regulating means and said driving apparatus, said switching means communicating said string of electric pulses from said current regulating means to said driving apparatus through said first polarity and second polarity connections whereby said driving apparatus moves said output in said first direction and said second direction according to said adjustment cycle.

14. The apparatus of claim 13 wherein said driving apparatus includes input terminals, wherein said controller further includes output terminals, and wherein said switching means communicates with said output terminals to automatically couple said output terminals to said input terminals in one of said first polarity and second polarity connections according to said adjustment cycle.

15. The apparatus of claim 13 wherein said switching means includes a stall sensor communicating with said controller.

16. The apparatus of claim 13 wherein said current regulating means is positionable in a first position wherein said current regulating means generates said pulse string and a second position wherein said current regulating means does not generate said pulse string, said apparatus further including activating means for placing said current regulating means in one of said first position to initiate said adjustment cycle and said second position to cancel said adjustment cycle.

17. The apparatus of claim 13 wherein said controller further includes a position indicator and a memory, said position indicator communicating with said driving means and said memory, said drive assembly defining an initial position when said adjustment cycle is initiated, said position indicator adapted to communicate said initial position to said memory when said adjustment cycle is initiated, said memory storing said initial position, said controller adapted to retrieve said initial position from said memory and return said driving assembly to said initial position when said adjustment cycle is cancelled.

18. A vehicle seat comprising:
 a frame;
 an elastically flexible supporting element coupled to said frame; and
 driving means for automatically and repeatedly moving said flexible supporting element through an adjustment cycle that includes a plurality of first consecutive incremental movements in a first direction followed by a plurality of second consecutive incremental movements in a second direction, each of said first and second consecutive incremental movements separated by a first time interval.

19. The vehicle seat of claim 18 wherein said frame includes a bottom and a back, said supporting element coupled to said back in a position to impact a lumbar region of a seat occupant.

20. The vehicle seat of claim 18 wherein said supporting element includes a body interconnecting an upper portion and a lower portion, said body adapted to bow upon displacement of said upper and lower portions toward one another.

21. A method for relieving muscle fatigue in a seat occupant by incrementally adjusting the curvature of a supporting element, said method comprising the steps of:
 placing a supporting element in a first position and in operative engagement with a muscle of a seat occupant, said first position defining a first degree of curvature;
 automatically adjusting the curvature of said supporting element according to an adjustment cycle that includes maintaining said first degree of curvature for a first time period, increasing the degree of curvature of said supporting element a first amount after said first time period to define a second degree of curvature, maintaining said second degree of curvature for a second time period, and decreasing the degree of curvature of said supporting element a second amount after said second time period to define a third degree of curvature, said first time period being equal to said second time period.

22. The method of claim 21 wherein the step of automatically adjusting the curvature of said supporting element includes communicating a string of electric pulses to a drive assembly coupled to said supporting element, said drive assembly adapted to adjust the curvature of said supporting element according to said adjustment cycle in response to said string of electric pulses.

* * * * *

UNITED STATES PATENT AND TRADEMARK OFFICE
CERTIFICATE OF CORRECTION

PATENT NO. : 5,816,653 Page 1 of 1
DATED : October 6, 1998
INVENTOR(S) : Joseph Benson It is certified that error appears in the above-identified patent and that said Letters Patent is hereby corrected as shown below:

<u>Column 5,</u>
Lines 36-48, the paragraph should read as follows:
-- As previously described, current regulator 40 is configured to communicate an electric current to polarity switch 42 during second time interval 46 and to prevent the flow of current during first time interval 44. In the preferred embodiment the duration of the first time interval 44 is within a range from about 5 seconds to about 25 seconds while the duration of the second time interval 46 is within a range from about 1.0 to 1.5 seconds. The preferred time periods are a first time interval 44 of fifteen (15) seconds and a seconds time interval 46 of one and one-tenth (1.1) seconds. By this arrangement, the one and one-tenth second electrical pulses are communicated to motor 22 every fifteen seconds to alter the curvature of the supporting element. --

Signed and Sealed this

Fifth Day of August, 2003

JAMES E. ROGAN
*Director of the United States Patent and Trademark Office*